C. V. PUGH.
INSECT TRAP.
APPLICATION FILED APR. 12, 1915.
1,185,935.
Patented June 6, 1916.
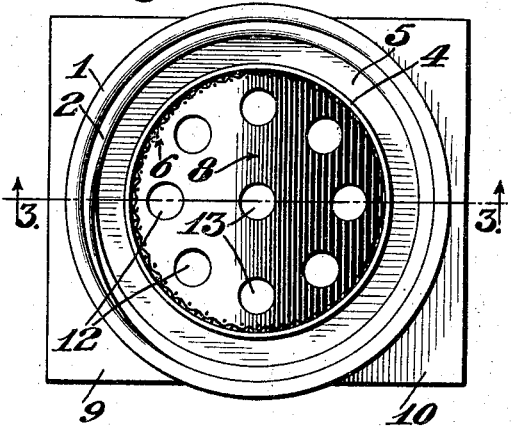
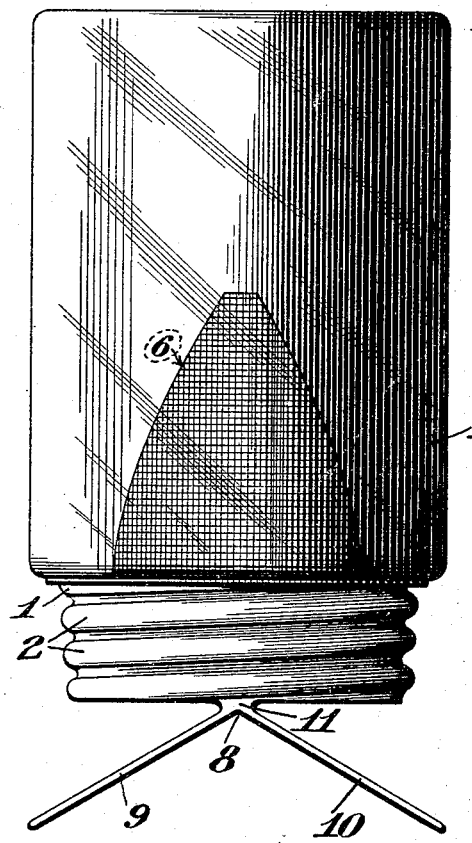
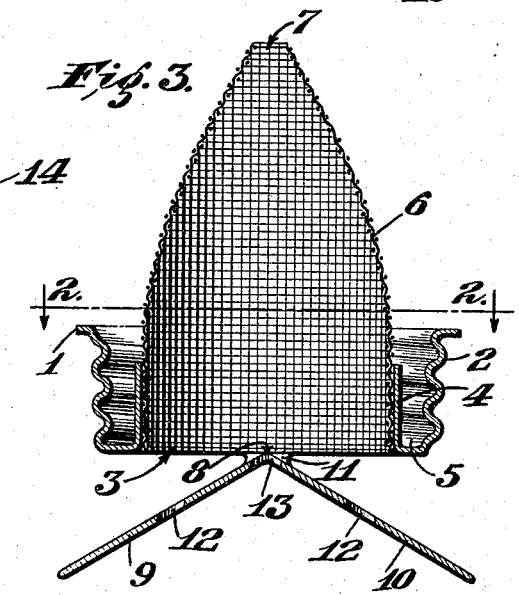
Witnesses:
G. A. Pennington
Stella Hill.
Inventor:
Cortez V. Pugh,
By Bruce A. Elliott,
his Atty.

UNITED STATES PATENT OFFICE.

CORTEZ V. PUGH, OF ST. LOUIS, MISSOURI, ASSIGNOR OF ONE-HALF TO ARVILLE A. VAN CLEAVE, OF ST. LOUIS, MISSOURI.

INSECT-TRAP.

1,185,935.  Specification of Letters Patent.  Patented June 6, 1916.

Application filed April 12, 1915. Serial No. 20,656.

*To all whom it may concern:*

Be it known that I, CORTEZ V. PUGH, a citizen of the United States, residing in the city of St. Louis, State of Missouri, have invented new and useful Improvements in Insect-Traps, of which the following is a specification.

This invention relates to insect traps, and has for its general object to provide a novel device of this character designed more particularly to entrap flies and roaches.

A specific object of the invention is to provide a portion of an insect trap adapted for attachment to an ordinary glass jar, such as used for preserves, pickles, and the like, so that when thus applied the glass jar will act as the cage for preventing the escape of flies.

With these objects in view the invention comprises a screw-threaded reservoir which is of the general construction of the cover of an ordinary "Mason" jar, but provided with a central opening in which is supported a conical wire-mesh dome having an opening in its top, and which is surrounded by a well for holding the bait. Other forms of reservoir, adapted for application to other forms of jar, or container, could be used and still be within the purview of my invention. For the reason, however, that preserve jars of the type referred to are a staple article, and are usually found in every household, I prefer to adapt the invention for use in connection with such a jar.

My invention is illustrated in the accompanying drawing, in which—

Figure 1 is a view in side elevation of an insect trap constructed according to my invention; Fig. 2 is a horizontal sectional view on the line 2—2 of Fig. 3; and Fig. 3 is a cross sectional view taken on the line 3—3 of Fig. 2.

Referring now to these drawings, the numeral 1 indicates a reservoir which, as stated, is preferably in the form of a cover of a glass preserving jar, to this end being provided with a screw-thread 2, and having an opening 3 in what would be the top of said cover, which opening is surrounded by an annular flange 4 providing a well 5 between the side of the reservoir and said annular flange, which is for containing the bait for attracting the insects. Such bait, as usual, may be in liquid, powdered, or other form, and may be poisonous or not, as desired. Mounted on the inner side of the annular flange 4 is a wire mesh dome 6, such as usually employed in fly traps, and provided with an opening 7 in its upper end. The support for the trap is preferably provided by bending a sheet of metal, such as block tin, to form a ridge 8 and inclined members 9, 10, the said ridge extending across the opening 3 and being secured at opposite ends to opposite sides of the reservoir 1, as by means of solder 11. Each of the inclined members 9, 10, is provided with perforations 12, a line of these perforations, indicated by 13, preferably extending along the ridge 8.

When the reservoir 1 is secured on the jar, such as indicated at 14, the device is then ready for use. Flies or other insects may crawl up the inclined supports 9, 10, from the outside, or if they should be beneath said supports they can pass through the openings 12 or 13 and enter the dome 6 through the opening 3, and passing out through the opening 7 at the top of said dome be caged in the jar 14. The inclined supports 9, 10, are intended more particularly to direct crawling insects, such as roaches, to enter and crawl up the inside of the dome 6; and it will be understood, of course, that before applying the reservoir to the jar 14, suitable bait will be placed in the well 5. Preferably the device is used for catching flies in the day time, and for catching roaches at night time, the bait being changed for the latter purpose if desired.

I claim:

1. An insect trap comprising a closure provided with means for attachment to a container and having a central opening surrounded by an upstanding annular flange, a dome secured at its larger end to said annular flange and having an aperture in its smaller end, and a support secured to said closure and extending below the opening therein.

2. An insect trap comprising a closure provided with a screw-threaded outer flange for application to an ordinary glass jar and having a central opening, an inner upstanding annular flange surrounding said opening and providing between said flanges an annular well, a tapered dome mounted at its larger end on said inner flange and having an aperture in its smaller end, and a support secured to said closure and extending below the opening therein.

3. An insect trap comprising a closure provided with an outer upstanding annular flange having means for application to a container and having a central opening, an inner upstanding annular flange surrounding said opening and providing between said flanges a well, a tapered wire mesh dome mounted at its larger end on said inner flange and provided with an aperture in its smaller end, and a support for the trap comprising a plate bent upon itself to form two inclined sides and secured at opposite ends of its ridge to opposite sides of said closure, said support having a central perforation surrounded by an annular series of perforations, a diametrical line of said perforations extending along the ridge of said support.

4. An insect trap comprising a closure adapted for application to a container and having a central opening, a tapered dome surrounding said opening and having an aperture in its smaller end, and a support for said device comprising a plate bent upon itself to form two inclined sides, and secured at opposite ends of its ridge to opposite sides of said closure and being provided with perforations beneath said central opening.

In testimony whereof, I have hereunto set my hand.

CORTEZ V. PUGH.

Copies of this patent may be obtained for five cents each, by addressing the "Commissioner of Patents, Washington, D. C."